F. J. HOBSON.

TRACTOR-ATTACHMENT FOR MOTOR VEHICLES.

APPLICATION FILED FEB. 4, 1916.

Reissued Oct. 10, 1916. 14,200.

Inventor:
Francis J. Hobson
by his Attorneys
Dyer & Brown

UNITED STATES PATENT OFFICE.

FRANCIS J. HOBSON, OF LOS ANGELES, CALIFORNIA, ASSIGNOR, BY DIRECT AND MESNE ASSIGNMENTS, TO E. CLARKSON SEWARD, TRUSTEE, OF BROOKLYN, NEW YORK.

TRACTOR ATTACHMENT FOR MOTOR-VEHICLES.

14,200. Specification of Reissued Letters Patent. Reissued Oct. 10, 1916.

Original No. 1,154,635, dated September 28, 1915, Serial No. 18,119, filed March 30, 1915. Application for reissue filed February 4, 1916. Serial No. 76,216.

*To all whom it may concern:*

Be it known that I, FRANCIS J. HOBSON, of Los Angeles, in the county of Los Angeles and State of California, have invented certain new and useful Improvements in Tractor Attachments for Motor-Vehicles, of which the following is a specification.

My invention has for its object to provide an improved means, in the nature of an attachment for motor vehicles, for securing traction for automobile tires when running through sand or on soft or rocky roads.

Another object of my invention is to provide a means for the purpose stated of a simple and economical construction that can be quickly applied for use without the requirement of special tools or labor.

Figure 1:
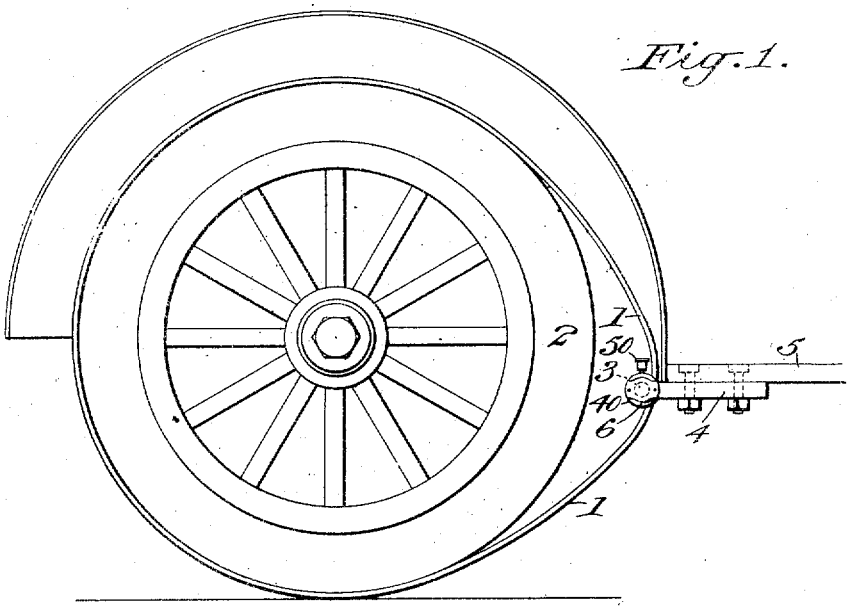
Figure 5:
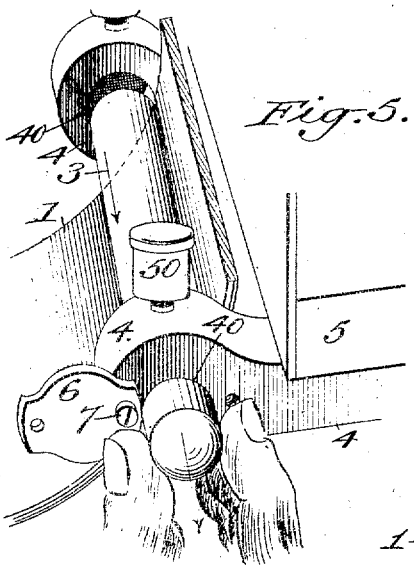
Figure 2:
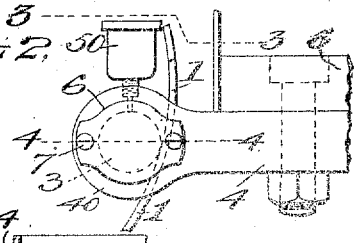
Figure 3:
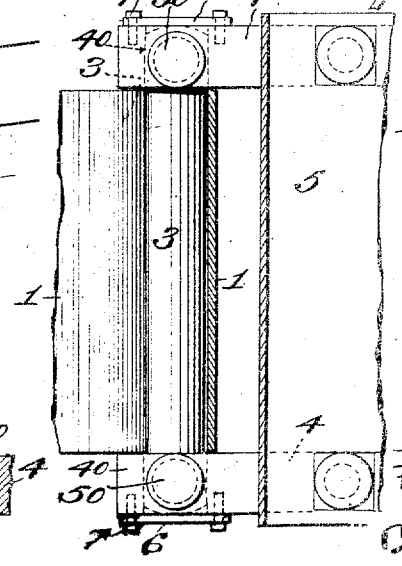
Figure 4:
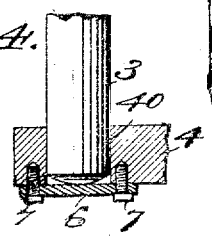

With objects in view that will hereinafter appear, my invention embodies the peculiar construction, and combination of parts hereinafter explained, specifically pointed out in the appended claims and illustrated in the accompanying drawings, in which:

Figure 1 is a side elevation of so much of a motor vehicle as is necessary to illustrate the application of my invention. Fig. 2 is an end elevation of the means for holding the endless belt or tractor attachment in the operation position. Fig. 3 is a horizontal section thereof taken on the line 3—3 of Fig. 2. Fig. 4 is a detail horizontal section of the same on the line 4—4 of Fig. 2. Fig. 5 is a detail perspective view that illustrates the endless belt holding roller and the manner of removably mounting it on the running board of the vehicle.

My traction attachment consists of an endless belt 1 of such size that it may be readily slipped onto the wheel 2 and over the holding member, in the nature of a roller 3 that is mounted in brackets 4, 4, which project from the inner and outer edges of the running board 5 and in the direction of the wheel 1. The brackets 4 which are secured to the running board by the bolts, as shown, have bearings 40 with each of which communicates a grease cup 5, for lubricating the roller bearings. The roller 3 is endwise slidable through the bracket bearings so it may be readily removed from or placed in the said bearings, and to hold the roller within the bearings, cap plates 6 are secured on the outside of the said bearings, as is clearly shown in Figs. 3 and 4 of the drawings.

The endless belt, which may be of rubber or other suitable material, when not required for use, can be readily carried in the "tool box," and when the said belt has been in use, it can be readily removed by loosening one of the screws 7 of one of the end cap plates so the plate may be swung back as shown in Fig. 5, to allow for shoving the roller 3 endwise out of the bearings, and from engagement with the belt, it being understood that when the belt is removed, the roller is shoved back and held in place by securing the loose cap plate back over the end thereof.

It will be noted that the roller 3 is mounted in front of the wheel and in close proximity to the periphery thereof. Furthermore, it lies only a short distance away from the horizontal plane of the axis of the wheel. This particular location of the roller is of major importance, as I have found, in practice, that, unless the said roller is mounted at a distance not more than about one-third of the extreme radius of the wheel, from the periphery of the latter and from the horizontal plane of the axis of the wheel, the action of the belt greatly restricts the speed of the vehicle; and there is also some danger of the belt being thrown off of the wheel. But, with the roller mounted, as shown in the drawings, or substantially within the limits just mentioned, the belt does not appreciably hamper the speed or operation of the vehicle, and remains in position on the wheel with the utmost reliability. This is due largely, if not exclusively, to the fact that the centrifugal force generated by the rotation of the wheel and forward movement of the vehicle, throws the belt farthest away from the wheel at a point directly in front of the same and in the horizontal plane of the axis of the wheel. Consequently, when the vehicle is in motion, there is a tendency for the belt to be thrown out of engagement with the roller 3, thus greatly eliminating friction; and the greater the speed of the vehicle, the greater this tendency. Thus, at a speed of said 20 to 30 miles an hour, the belt runs entirely free of the roller 3, and continues to so operate as the speed is increased. This important feature could not be attained if the roller 3 were not located substantially as shown and described. It will also be understood, that, when the vehicle is passing over uneven ground, there is considerable variation in the vertical relationship of the chassis and its wheels, due to spring action; which movement would bring about frequent and considerable changes in the space between the wheel and the roller, if the latter were mounted a considerable distance above or below the horizontal plane of the axis of the wheel. Thus, at one moment the belt would be too loose and at another moment too tight; while the danger of the roller and wheel tire coming into contact would also be present. The arrangement I have devised eliminates this factor, while the rear end of the running board on a pleasure car, generally provides a secure, convenient and inconspicuous place for mounting the roller, and one which is properly located, as shown in the drawings. Again, by mounting the roller 3 very close to the periphery of the wheel, a belt can be used which is only slightly greater in length than the circumference of the wheel it surrounds, thereby obviating the chance of the belt being thrown off, while enabling the belt to be looser than would be feasible if the roller were farther away from the wheel. A long belt (necessary if the wheel and roller are far apart) must be tight to stay on the wheel; and the tighter the belt, the more difficult is the operation of the arrangement, due to the drag of the belt and the friction of the roller in its bearings. In sum, the particular location of the roller enables the provision of a device of the character described, in which the belt runs very freely while the vehicle is in motion, which is highly practical and efficient and which may be used as a non-skid traction device on high speed pleasure cars, even when traversing very slippery roads, without presenting handicaps of unreliability, excessive friction or noise.

By reason of providing an attachment as described, when the same is attached to the wheel and the roller 3 in the manner shown, traction is obtained on the worst sandy roads, up-grades, soft roads and loose rocky roads, making passable roads that are impassable without my attachment. In addition to providing traction, my attachment protects tires from punctures, stone bruises and materially increases the mileage obtained with tires on ordinary roads.

What I claim is:

1. In a motor vehicle, the combination with the wheel, the running board and guide brackets on the said board that project therefrom in the direction of the wheel; of an idler roller endwise removably mounted in the said guides, means on the guides for locking the roller from endwise movement and an endless traction belt passing around the wheel and the said roller.

2. In a motor vehicle, the combination with the wheel, the running board and guide brackets at the rear end of said board, of an idler roller mounted in the said guide brackets, and a belt passing around the wheel and the said roller.

3. In a motor vehicle, the combination with the wheel, the running board and guide brackets at the rear end of said board, of an idler roller mounted in said guide brackets, and a belt passing around the wheel and the said roller, the said roller being movable in the guide brackets to permit of the complete removal of the belt from the vehicle.

4. In a motor vehicle; the combination with a tractor wheel, the running board, and a pair of spaced guide brackets secured to the running board and projecting therefrom in the direction of the wheel, said brackets each having a transverse bearing aperture; of an idler roller journaled in the bearing apertures of the brackets and adapted for having endwise movement through the said brackets, and a traction belt that takes around the wheel and the said roller, and means comprising pivoted cap members on the brackets for closing the bearings to hold the idler roller against endwise movement.

5. In a motor vehicle, the combination of a traction wheel, a belt guide, and a traction belt passing around the periphery of the wheel and through the guide, the said guide being adapted to limit the movement of the belt either away from the plane of the wheel or toward the wheel, and being located substantially in the plane of the wheel and in very close proximity to the periphery thereof, the belt being somewhat slack so that the motion of the vehicle will tend to throw the belt out of engagement with the guide and thereby lessen the frictional contact between the belt and guide.

6. In a motor vehicle, the combination of a traction wheel, a belt guide, and a traction belt passing around the periphery of the wheel and through the guide, the said guide being located in very close proximity to the periphery of the wheel and to the horizontal plane of the axis of the wheel, the belt being somewhat slack so that the motion of the vehicle will tend to throw the belt out of engagement with the guide and thereby lessen the frictional contact between the belt and guide.

7. In a motor vehicle, the combination of a traction wheel, a belt guide, and a traction belt passing around the periphery of the wheel and through the guide, the said guide being located not more than substantially one-third the radius of the wheel away from the periphery thereof and from the horizontal plane of the axis of the wheel, the belt being somewhat slack so that the motion of the vehicle will tend to throw the belt out of engagement with the guide and thereby lessen the frictional contact between the belt and guide.

8. In a motor vehicle, the combination with a traction wheel, a belt guide located substantially in the plane of the wheel, and a traction belt passing around the periphery of the wheel and through the guide, the said guide having a roller for limiting the movement of the belt toward the wheel and means for limiting the movement of the belt away from the plane of the wheel, and the said roller being located in very close proximity to the periphery of the wheel, the belt being somewhat slack so that the motion of the vehicle will tend to throw the belt out of engagement with the roller and thereby lessen the frictional contact between the belt and roller.

9. In a motor vehicle, the combination of a traction wheel, a roller, and a traction belt passing around the periphery of the wheel and the roller, the said roller being located in very close proximity to the periphery of the wheel and to the horizontal plane of the axis of the wheel, the belt being somewhat slack so that the motion of the vehicle will tend to throw the belt out of engagement with the roller and thereby lessen the frictional contact between the belt and roller.

10. In a motor vehicle, the combination of a traction wheel, a roller, and a traction belt passing around the periphery of the wheel and the roller, the said roller being located not more than substantially one-third the radius of the wheel away from the periphery thereof and from the horizontal plane of the axis of the wheel, the belt being somewhat slack so that the motion of the vehicle will tend to throw the belt out of engagement with the roller and thereby lessen the frictional contact between the belt and roller.

11. In a motor vehicle, the combination of a traction wheel, a roller, and a traction belt passing around the periphery of the wheel and the roller, the said roller being located substantially in the plane of the wheel and in very close proximity to the periphery thereof, the belt being somewhat slack so that the motion of the vehicle will tend to throw the belt out of engagement with the roller and thereby lessen the frictional contact between the belt and roller, and the said roller being movably mounted to permit of the complete removal of the belt from the vehicle.

12. In a motor vehicle, the combination with a traction wheel, a belt guide located substantially in the plane of the wheel, and a traction belt passing around the periphery of the wheel and through the guide, the said guide having a roller for limiting the movement of the belt toward the wheel and means for limiting the movement of the belt away from the plane of the wheel, and the said roller being located in very close proximity to the periphery of the wheel, the belt being somewhat slack so that the motion of the vehicle will tend to throw the belt out of engagement with the roller and thereby lessen the frictional contact between the belt and roller, and the said roller being movably mounted to permit of the complete removal of the belt from the vehicle.

13. In a motor vehicle, the combination of a traction wheel, a roller, and a traction belt passing around the periphery of the wheel and the roller, the said roller being located in very close proximity to the periphery of the wheel and to the horizontal plane of the axis of the wheel, the belt being somewhat slack so that the motion of the vehicle will tend to throw the belt out of engagement with the roller and thereby lessen the frictional contact between the belt and roller, and the said roller being movably mounted to permit of the complete removal of the belt from the vehicle.

14. In a motor vehicle, the combination of a traction wheel, a roller, and a traction belt passing around the periphery of the wheel and the roller, the said roller being located not more than substantially one-third the radius of the wheel away from the periphery thereof and from the horizontal plane of the axis of the wheel, the belt being somewhat slack so that the motion of the vehicle will tend to throw the belt out of engagement with the roller and thereby lessen the frictional contact between the belt and roller, and the said roller being movably mounted to permit of the complete removal of the belt from the vehicle.

15. In a motor vehicle, the combination with the wheel, the running-board and guide brackets at the rear end of said board, of an elongated idler roller mounted in the said guide brackets, and a belt passing around the wheel and the said roller.

16. In a motor vehicle, the combination of a traction wheel, an elongated roller and a traction belt passing around the periphery of the wheel and the roller, the said roller being located substantially in the plane of the wheel and in close proximity to the periphery thereof, the belt being somewhat slack so that the motion of the vehicle will tend to throw the belt out of engagement with the roller and thereby lessen the frictional contact between the belt and roller.

17. In a motor vehicle, the combination of a traction wheel, an elongated roller, and a traction belt passing around the periphery of the wheel and the roller, the said roller being located not more than substantially one-third of the radius of the wheel away from the periphery thereof and from the horizontal plane of the axis of the wheel, the belt being somewhat slack so that the motion of the vehicle will tend to throw the belt out of engagement with the roller and thereby lessen the frictional contact between the belt and roller.

In testimony that I claim the foregoing as my invention, I have signed my name this 24th day of January, 1916.

FRANCIS J. HOBSON.